(12) United States Patent
Hughes

(10) Patent No.: US 8,245,412 B2
(45) Date of Patent: Aug. 21, 2012

(54) APPARATUS FOR DETERMINING TAPE AND REEL PART QUANTITIES

(75) Inventor: William C. Hughes, Woodstock, IL (US)

(73) Assignee: Innoquest, Inc., Woodstock, IL (US)

( * ) Notice: Subject to any disclaimer, the term of this patent is extended or adjusted under 35 U.S.C. 154(b) by 0 days.

(21) Appl. No.: 13/156,455

(22) Filed: Jun. 9, 2011

(65) Prior Publication Data

US 2011/0302798 A1    Dec. 15, 2011

Related U.S. Application Data

(60) Provisional application No. 61/397,509, filed on Jun. 11, 2010.

(51) Int. Cl.
*G01B 3/02* (2006.01)
(52) U.S. Cl. ............................................. 33/563; 33/733
(58) Field of Classification Search .................. 33/1 SB, 33/562, 563, 732, 733, 734, 735, 736, 737, 33/755, 763
See application file for complete search history.

(56) References Cited

U.S. PATENT DOCUMENTS

| | | | | |
|---|---|---|---|---|
| 4,181,960 A | * | 1/1980 | Tateishi et al. | 33/760 |
| 4,598,492 A | * | 7/1986 | Stanfield | 294/19.3 |
| 5,426,863 A | * | 6/1995 | Biggel | 33/763 |
| 5,433,014 A | * | 7/1995 | Falk et al. | 33/763 |
| 6,904,690 B2 | * | 6/2005 | Bakke et al. | 33/562 |
| 7,458,170 B1 | * | 12/2008 | Richardson | 33/734 |
| 7,861,429 B2 | * | 1/2011 | Lee | 33/562 |
| 2008/0277469 A1 | * | 11/2008 | Corriveau et al. | 235/385 |

* cited by examiner

*Primary Examiner* — G. Bradley Bennett
(74) *Attorney, Agent, or Firm* — Reinhart Boerner Van Deuren P.C.

(57) ABSTRACT

An apparatus for counting parts in a tape and reel packaging system in which a plurality of parts are packaged on linear tape wound onto a reel. The apparatus includes a measuring device, and a meter body. The meter body includes electronic means for calculating and displaying a quantity of parts in the tape and reel packaging system. The calculation is based on inputs supplied by a user employing the measuring device. In an embodiment, the apparatus is portable and configured to be hand-held.

23 Claims, 4 Drawing Sheets

APPARATUS FOR DETERMINING TAPE AND REEL PART QUANTITIES

CROSS-REFERENCE TO RELATED PATENT APPLICATIONS

This patent application claims the benefit of U.S. Provisional Patent Application No. 61/397,509, filed Jun. 11, 2010, the entire teachings and disclosure of which are incorporated herein by reference thereto.

FIELD OF THE INVENTION

This invention generally relates to measurement devices, and more particularly, to measurement devices for determining a quantity of items, such as might be found on a tape and reel storage system.

BACKGROUND OF THE INVENTION

It is common practice to store or package surface-mount electronic components in evenly-spaced pockets on linear tape. For convenient storage, transport, and dispensing of these components, linear tape containing the components is typically wrapped around round reels. Within the electronics industry, this practice is referred to as "tape and reel" packaging. In this way a large number of small components may be stored in an orderly way for use in automated robotic assembly machines. The linear tape is typically provided with small, equally-spaced holes along the length of the tape, which facilitate feeding the tape into automatic machines, which typically include cogged wheels that engage the holes in the tape.

There are several conventional methods for measuring the number of parts left on a reel after an unknown quantity of parts have been removed. A first method involves estimating the number of parts by comparing an outside diameter of the last wrap of tape to a graduated scale printed on the reel frame. A second method involves running the entire tape through a counting machine to count every part. A third method involves weighing the reel to estimate part counts. There are several drawbacks to all of the aforementioned conventional practices.

The first conventional method results in only a rough estimate, the accuracy of which is limited by the markings on the reel. Such markings are often only accurate to within 25% of the actual quantity of parts. Further, variations in the thickness of the tape used contribute to this inaccuracy. Since there is no standard for tape thickness due to the wide variety of component sizes, in many cases the reel markings are not accurate for the tape that resides on the reel. Attempts to reduce the inaccuracies due to incorrect reel marking are further complicated by the inability to verify which tape thickness a reel is actually marked for.

The second conventional method of measuring part quantities involves mounting the reel to be counted on a spindle and feeding the tape through a counting mechanism and onto an empty reel. The empty reel is then rotated to pull the tape off of the primary reel and though the counting mechanism. When the counting is finished, if it is desired to have the tape back on the primary reel, it must then be transferred back to the primary reel in a similar manner. While this method is generally very accurate, since it counts each part, it is also a tedious and time-consuming process that requires a bench mounted machine and increases the cost of production. Furthermore, additional time is consumed transporting these reels to and from the counting machine. Further, there must be a matching blank reel available for the process to take place. This method also requires a fairly skilled operator to adjust the machine for different part types and reel sizes. Moreover, the cost of these counting machines is often prohibitive for small businesses.

The third conventional method of measuring part quantities, which involves weighing the reel to determine part counts, requires a very accurate weighing scale. Typically, this method requires knowledge of the weight of the reel when full and when empty. This accuracy needed for this method can typically only be obtained with a bench top scale that is properly leveled. Therefore, it is difficult to transport this type of system to different points of use. Further, determination of the empty weight of the reel may be hard to determine unless an empty reel of the exact type to be measured is also available. Highly accurate scales can be costly, and still require some means of calculating the number of parts once the weight has been determined.

It would therefore be desirable to have a portable apparatus which allows for component counts to be determined with a reasonably high degree of accuracy, and which is less expensive than some of the conventional measurement devices mentioned above. Further, it would also be desirable for the portable apparatus to be easily operated, eliminating the need for a skilled operator.

Embodiments of the invention provide such an apparatus. These and other advantages of the invention, as well as additional inventive features, will be apparent from the description of the invention provided herein.

BRIEF SUMMARY OF THE INVENTION

In one aspect, embodiments of the invention provide an apparatus for determining a quantity of parts in a tape and reel packaging system in which a plurality of parts are packaged in a tape wound onto a reel. The apparatus includes a measuring device, and a meter body. The meter body includes an electronic means for calculating and displaying a quantity of parts in the tape and reel packaging system. Calculation of the part quantity is based on inputs supplied by a user employing the measuring device. In an embodiment of the invention, the apparatus is portable and configured to be hand-held.

In another aspect, embodiments of the invention provide a method of quantifying parts stored on a tape and reel system. The method includes determining a radius of a center hole in a standard reel, the reel configured to have tape wound thereon, the tape configured to store a plurality of parts therein, and including the radius in a measurement apparatus as a pre-set constant. The method also includes measuring a first distance from an edge of the center hole to an inner surface of the tape, and entering the first distance into the measurement apparatus, measuring a second distance from an edge of the center hole to an outer surface of the tape, and entering the second distance into the measurement apparatus. In an embodiment, the method calls for measuring a thickness of the linear tape using the measurement apparatus, and entering the thickness measurement into the measurement apparatus. Further, embodiments of the method include measuring a distance between the centers of two adjacent parts stored in the linear tape, and entering the distance-between-the-centers-of-the-two-adjacent-parts measurement into the measurement apparatus, and configuring the measurement apparatus to automatically calculate and display the quantity of parts in the tape as the required inputs are entered.

In yet another aspect, particular embodiments of the invention provide an apparatus to determine the quantity of parts in a tape and reel package by computing the count based on geometric measurements of the tape and of the reel. The tape has parts nested into pockets equally spaced along its length. In a more particular embodiment, the parts are electronic components. The tape also has equally-spaced feed holes along its length. In a particular embodiment, the spacing of the feed holes is the same no matter what size part is placed in the tape. Parts are placed along the tape in even increments of feed-hole spacing. Therefore if the number of feed holes can be determined for the entire length of tape, then simple division will yield the number of parts in the tape. The number of parts is therefore directly related to the length of the tape which is wrapped on the reel. The length of the tape is a function of the inner radius of the wrap of tape, the outer radius of the wrap of tape, and the thickness of the tape. Embodiments of the present invention provide the measuring tools for making the required measurements, and allows the measurements to be entered into an electronic portion of the apparatus via a keypad. In a particular embodiment, the electronic portion includes a microcontroller configured to first calculate the length of tape, then to calculate the number of feed holes, and finally to calculate the number of parts in the tape.

In a particular embodiment, the apparatus includes a hand-held electronic meter which is battery powered and integrally contains all the rulers, scales, and gauges required to measure the diameters of tape wrap as well as tape thickness. In a more particular embodiment, the apparatus includes an electronic circuit with keypad to allow entering of measurement values, and further includes a display to show calculated part quantities.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in conjunction with certain preferred embodiments, there is no intent to limit it to those embodiments. On the contrary, the intent is to cover all alternatives, modifications and equivalents as indicated within the spirit and scope of the invention as defined by the appended claims.

DETAILED DESCRIPTION OF THE INVENTION

Figure 1:
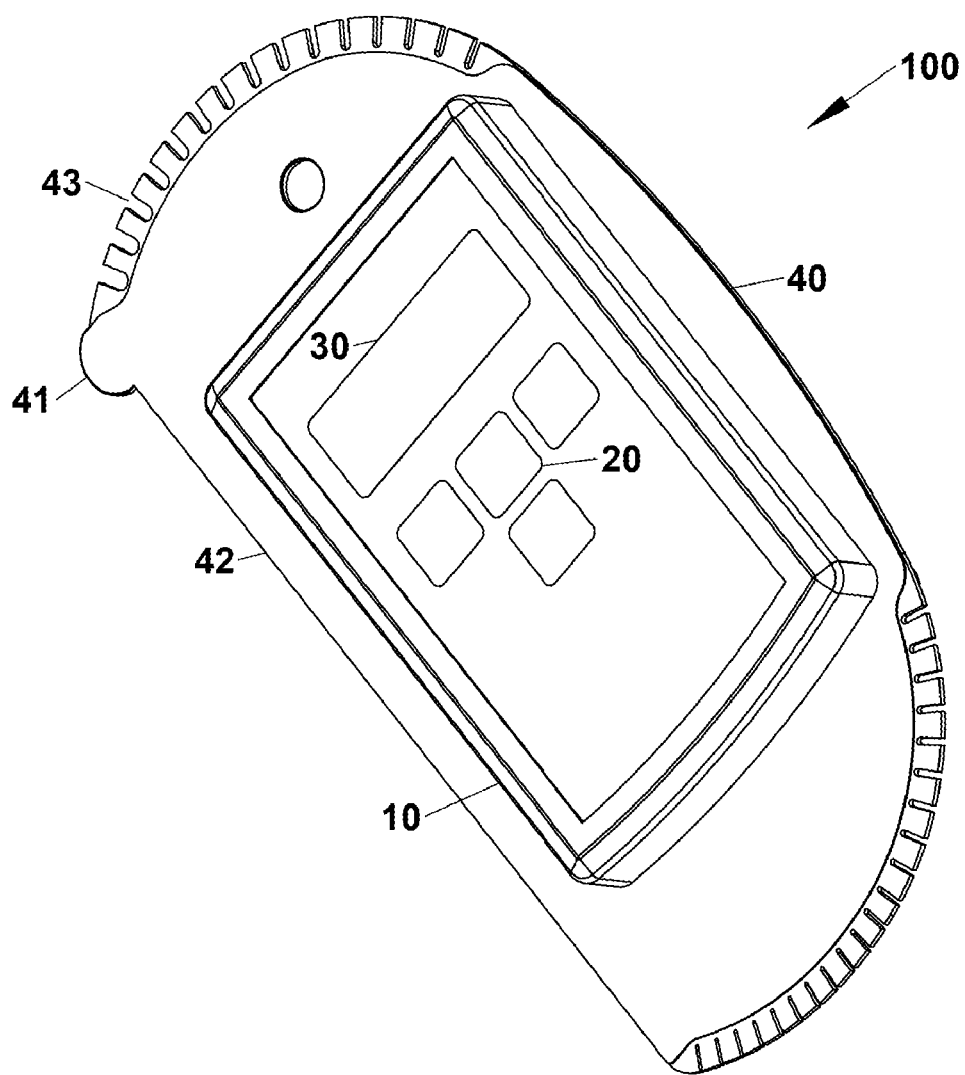
FIG. 1 is a perspective view of an apparatus for determining tape and reel part quantities, constructed in accordance with an embodiment of the invention.
Figure 2:
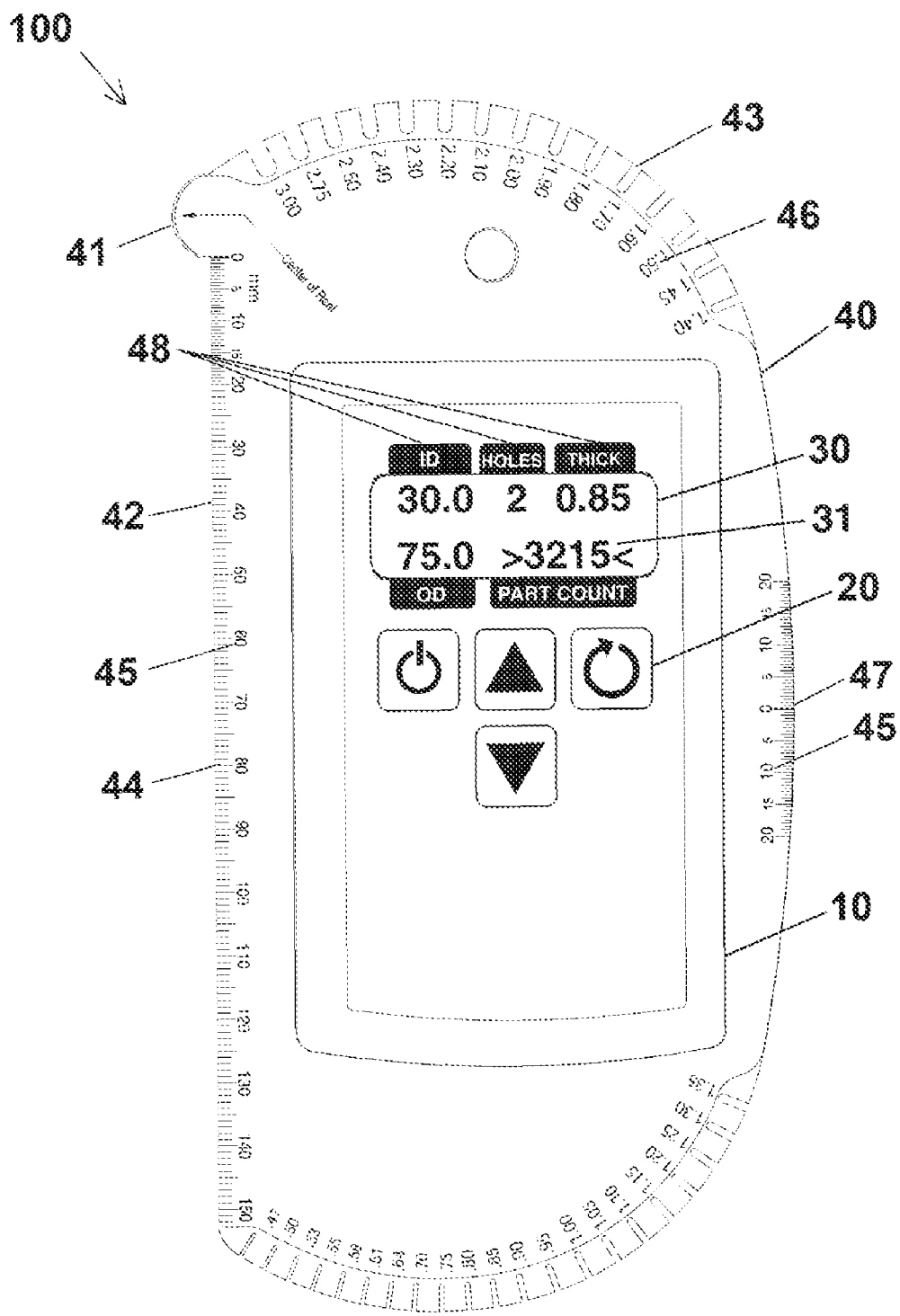
FIG. 2 is a front view of the apparatus for determining tape and reel part quantities of FIG. 1.

An apparatus 100 for determining tape and reel part quantities, constructed in accordance with an embodiment of the invention, is shown in FIGS. 1 and 2. The apparatus 100 includes a meter body 10 and a measuring device, in this case, comprising a measuring plate 40, which is integrally attached and not removable from the meter body 10. However, in alternate embodiments of the invention, the meter body 10 is removably attached to measuring plate 40. Still, in other embodiments, the measuring plate 40 and meter body 10 are physically separated.

The meter body 10 contains an electronic circuit 70 that includes a microcontroller 75 and memory 76 coupled to the microcontroller 75 (shown in FIG. 6), replaceable battery 80 (shown in FIG. 6), keypad 20, and display 30. The measuring plate 40 contains ruler 42 for measuring a first distance 54 and a second distance 55 (both shown in FIG. 3) of a tape and reel package 200 (shown in FIG. 3). The measuring plate 40 also contains slotted gauges 43 and ruler 47 for measuring the thickness 56 (shown in FIG. 3) of tape 60 (shown in FIG. 3) of a tape and reel package 200. After measurements of the first distance 54, the second distance 55, the tape thickness 56, and determination of the component spacing 63 (shown in FIG. 4) have been made, the values are entered by the user into the microcontroller 75 (shown in FIG. 6) of electronic circuit 70 using keypad 20. Based on these inputs, the microcontroller 75 calculates a value for part quantity 31, which is shown on the display 30.

Figure 6:
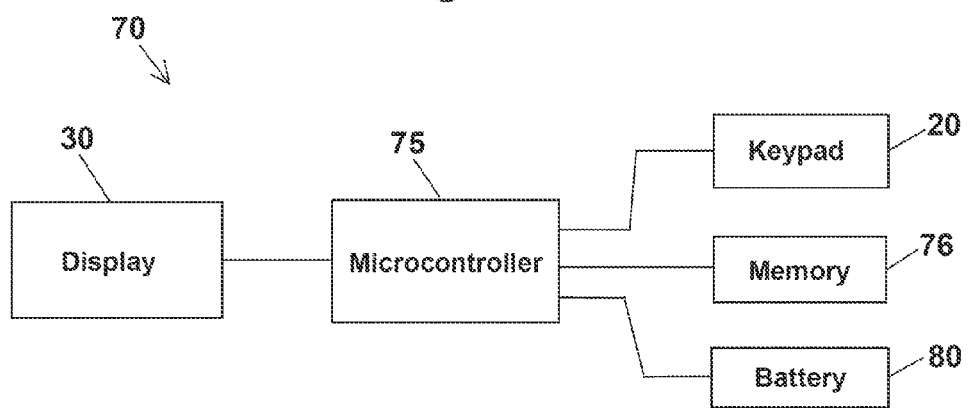
FIG. 6 is a block diagram of the electronic circuit used in the apparatus of FIG. 1, according to an embodiment of the invention.

Now referring to FIG. 1 in more detail, the apparatus 100 for determining tape and reel part quantities is comprised of a meter body 10 which serves to provide a protective housing and physical mount for electronic circuit 70 (shown in FIG. 6), keypad 20, display 30, and battery 80 (shown in FIG. 6).

Meter body 10 may be constructed of metal, plastic, or other suitable material. In a preferred embodiment, meter body 10 is constructed of injection molded plastic and includes a front side and back side. The back side contains a removable door to allow for replacement of battery 80 when needed. In a preferred embodiment, meter body 10 is sized to be held in the hand, allowing the apparatus 100 to be portable to its point of use.

In a particular embodiment, meter body 10 is fixedly attached to measuring plate 40. In at least one embodiment, the measuring plate 40 is attached to meter body 10 by sandwiching it between the front and back sides of the meter body 10 before the two sides are fastened together. In other embodiments, meter body 10 may be attached to measuring plate 40 using a variety of methods including, but not limited to, screws, adhesives, by snap fit, press fit, or other suitable means. In this way, measuring plate 40 becomes an integral part of meter body 10 and therefore forms a complete unit as shown by preferred embodiment 100. As stated above, in alternate embodiments the meter body may be removably attached to measuring plate 40, or may be physically separate from measuring plate 40.

Now referring to FIG. 2 in more detail, meter body 10 contains printing or markings 48 to illustrate what values are displayed on display 30, as well as the parameter being controlled by certain keypad 20 buttons. Measuring plate 40 contains printing or markings 46 to illustrate the sizes of slotted gauges 43, tick marks 44, and markings 45 on rulers 42 and 47. This printing or marking on meter body 10 or measuring plate 40 can be applied using several methods, including direct printing, chemical or laser etching, placement of a graphic overlay or label, or other means of making a permanent mark. In a particular embodiment, the printing or marking is accomplished by adhering preprinted self-adhesive graphic overlays to the measuring plate 40.

Figure 3:
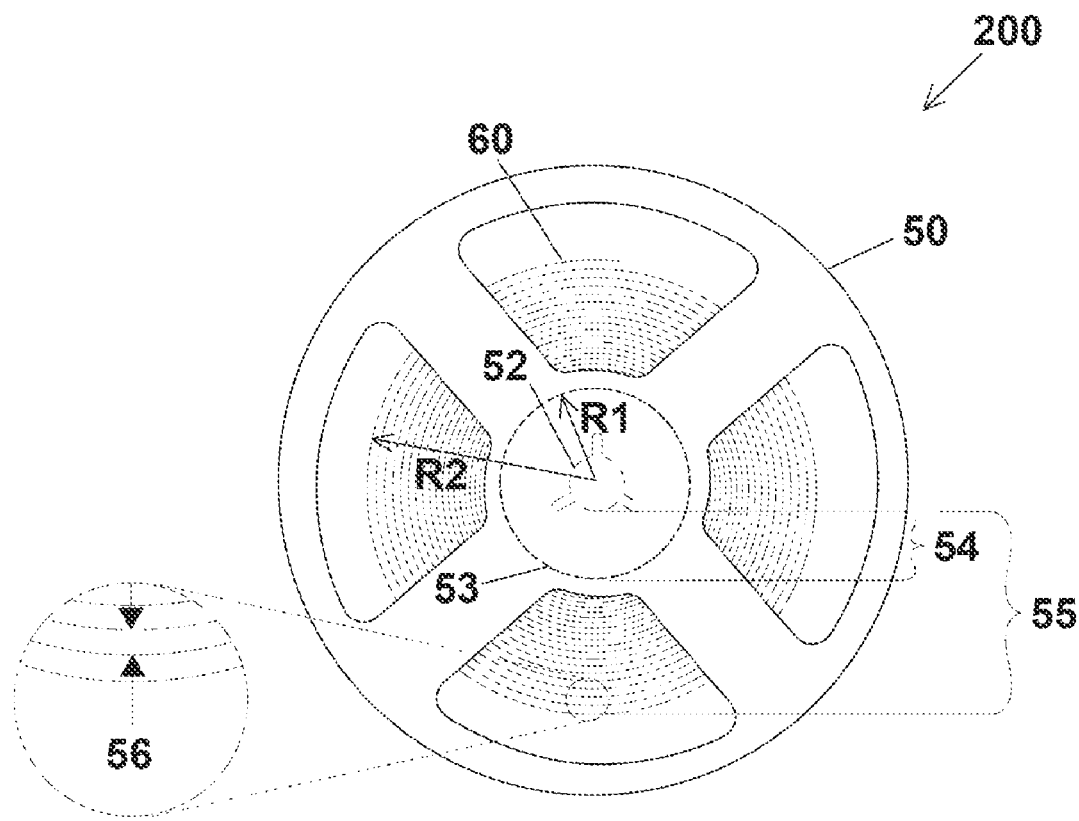
FIG. 3 is a front view of an exemplary tape and reel package on which embodiments of the invention may be used.
Figure 4:
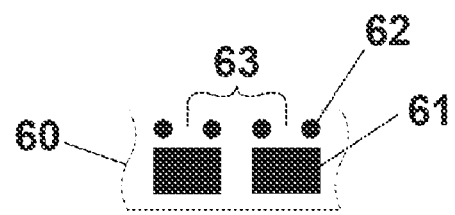
FIG. 4 is a close up view of a portion of tape from a tape and reel package which can be measured by embodiments of the invention.

Turning now to FIGS. 3 and 4, the tape and reel package 200 will be described in more detail, primarily because a more detailed description of tape and reel package 200 is necessary to understanding how the invention functions. Tape and reel package 200 is comprised of linear tape 60 that contains equally-spaced pockets 61 along its length to hold a plurality of parts, typically electronic components. The part spacing 63 of the pockets 61 varies depending on many factors, including the type of component stored. Linear tape 60 also has equally-spaced feed holes 62 along its length to facilitate its use in automated equipment. Typically, the spacing of the feed holes 62 is an industry standard among all tape sizes and part types. For example, a typical spacing between feed holes 62 is about four millimeters. In an embodiment of the invention, this feed-hole spacing is stored in memory 76 as a pre-set constant.

The linear tape 60 and parts therein are wound onto reel 50 to allow compact and convenient storage of parts. Linear tape 60 has a thickness 56, which varies depending on many factors including the type of part or component stored. Reel 50 includes an inner race 53 around which linear tape 60 is wrapped. The diameter of inner race 53 therefore becomes the inside diameter of the tape wrap. Reel 50 contains a center hole 52, which is an industry standard size. In an embodiment of the invention, the radius of center hole 52 is stored in memory 76 (shown in FIG. 6) as a pre-set constant.

In a particular embodiment, the first distance 54 of the tape wrap is measured from a near edge of center hole 52 to an outer edge of inner race 53. Measuring from the outside diameter of the center hole 52 allows for quantity determination without the need to obtain the exact diameter of hole 52. However, in specific embodiments of the invention, the first distance 54 may be measured from other starting points, including the center of center hole 52, or a far edge of center hole 52.

In a particular embodiment, the second distance 55 of the tape wrap is measured from a near edge of center hole 52 to an outer edge of the tape wrap. However, as with the first distance 54, the second distance 55 may be measured from other starting points, including the center of center hole 52, or a far edge of center hole 52. Depending on the length of linear tape 60 that is wrapped on reel 50, the second distance 55 of the tape wrap will vary.

Depending on the type of part that is contained in linear tape 60, the thickness 56 of the linear tape 60 will vary as well. It is therefore possible to determine the quantity of parts in tape and reel package 200 by measuring the tape thickness 56, part spacing 63, first distance 54 and second distance 55, using these values in a mathematical calculation, which will be discussed in more detail below.

Figure 5:
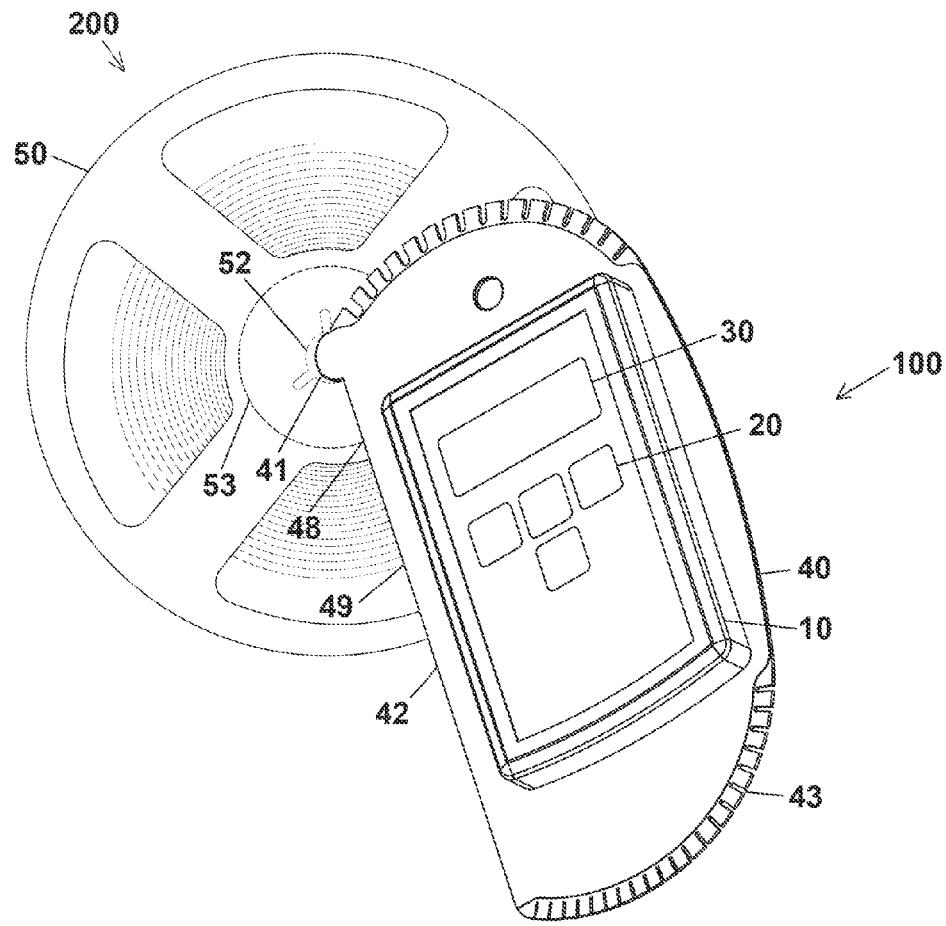
FIG. 5 is a perspective view of the apparatus of FIG. 1 illustrating its use on the tape and reel package of FIG. 3.

Referring to FIGS. 2 and 5, measuring plate 40 is now described in more detail. Ruler 42 is provided along one side of measuring plate 40 for measuring the first distance 54 and the second distance 55. In a particular embodiment, protrusion 41 is sized to fit into the center hole 52, as shown in FIG. 5. By this means, the zero point of ruler 42 is accurately located at a near edge of center hole 52. Ruler 42 is made up of tick marks 44 and numbers 45 such that a user can accurately determine first distance 54 at point 48 and second distance 55 at point 49 along the ruler 42 (shown in FIG. 5). In this way, the user may quickly determine first and second distances 54, 55 using measuring plate 40.

Measuring plate 40 also contains slotted gauges 43 which have size markings 46. Each of the slots 43 is of a different width to allow a user to accurately measure the thickness 56 of linear tape 60. In many instances, the thickness 56 of linear tape 60 will be too small to be accurately measured by a ruler, such as ruler 42 or ruler 47. In a particular embodiment, slotted gauges 43 are provided to allow for accurate determination of thickness 56 without the cost or complexity of certain other types a mechanical or electronic measuring means.

Measurement of thickness 56 can be accomplished with slotted gauges 43 in two ways. First, linear tape 60 may be exposed from reel 50 and slid into slotted gauges 43 to determine its thickness. In the second method, measuring plate 40 may be held so that slotted gauges 43 can have their width compared to the thickness 56 of the tape while it is still wrapped on reel 50. In the latter case, it may be more difficult to accurately determine tape thickness 56, but there is a benefit of not having to open up or unroll a secured tape and reel package 200. In the event that the thickness 56 of the linear tape 60 is too great to be measured in slotted gauges 43, then ruler 42 or ruler 47 may be used to measure the thickness 56 of the linear tape 60 by visually comparing a wrapped or unwrapped portion of the linear tape 60 to the graduations on the rulers 42, 47. In a particular embodiment, ruler 47 is provided with markings 45 increasing numerically in two directions along an edge of measuring plate 40. This allows easy use for both right- and left-handed operators, regardless of the position of the reel 50 when the measurement of the tape width 56 is taken. Ruler 47 is included on the measuring plate 40 so that accurate measurements of tape thickness 56 can be made in the event that use of ruler 42 is hindered by protrusion 41.

Also, if the user is right- or left-handed, or depending on the position of the reel 50 during the measuring process, ruler 47 is provided for readings to be made to the left or to the right. Measuring plate 40 may be constructed of metal, cut or molded plastic, or other suitably rigid material. Due to the hand-held nature of the device, the apparatus 100 and the desire to have accurate measurements over its life, it is advantageous if the measuring plate 40 is made from a rigid material with accurately fashioned slotted gauges 43. In a particular embodiment, measuring plate 40 is made from aluminum to provide corrosion resistance, low-weight, and excellent dimensional stability.

Now referring to FIG. 6, electronic circuit 70 is described in more detail. Electronic circuit 70 includes a microcontroller 75 powered by battery 80. Measured values of the first distance 54, the second distance 55, the part spacing 63, and the thickness 56, acquired with the use of measuring plate 40 on tape and reel package 200, are input to microcontroller 75 via keypad 20. Pressing one or several of the buttons on keypad 20 allows for each of the various measurements discussed above to be input to electronic circuit 70 and microcontroller 75. Entered values are displayed on display 30 which is connected to microcontroller 75 along with keypad 20.

Referring again to FIG. 2, keypad 20 may comprise any suitable set of buttons or membrane switches. In a particular embodiment, the keypad 20 is comprised of buttons placed under a graphic overlay that is flexible enough to allow activation of the buttons while providing an easy to clean, and attractive assembly. Display 30 may be an LCD, LED, or other suitable type of graphical display. In a particular embodiment, display 30 is an LCD-type display due to its low power consumption.

Referring again to FIG. 6, as stated above, electronic circuit 70 also includes memory 76. In a particular embodiment, memory 76 is a non-volatile type, and is coupled to microcontroller 75 and provides retention of the last entered measurements after power to electronic circuit 70 and microcontroller 75 is turned off. This allows for minimal adjustment or changing of entered measurements after power to the electronic circuit 70 is restored. This minimizes the amount of time required to measure a new tape and reel package 200 (shown in FIG. 3), especially if it has several dimensions identical to the one last measured by the user of apparatus 100 (shown in FIG. 2). In at least one embodiment, microcontroller 75 runs custom software code that handles all of the aforementioned peripherals, and allows apparatus 100 to perform all necessary functions for determining tape and reel part quantities as described herein.

Further describing electronic circuit 70 and its custom software code, the microcontroller 75 automatically calculates the quantity of parts based on the equation shown below after each of the values for the first distance 54 (shown in FIG. 3), second distance 55, tape thickness 56, and part spacing 63 (shown in FIG. 4) have been entered into apparatus 100. In a particular embodiment, the microcontroller 75 calculates the inner radius of the tape R1 (shown in FIG. 3) by adding the radius of the center hole 52 (a pre-set constant) to the first distance 54. Similarly, the outer radius of the tape R2 (shown in FIG. 3) is calculated by adding the radius of the center hole 52 to the second distance 55. Next, the number of feed holes 62 is determined for the entire length of linear tape 60 as follows:

$$\text{Number of Feed Holes} = \frac{\pi * [(R2)^2 - (R1)^2]}{\text{tape thickness} * \text{feed hole spacing}}$$

Then, the number of parts can be calculated from the number of feed holes 62 by knowing the number of feed holes between part spacing 63 as follows:

$$\text{Number of Parts} = \frac{\text{number of feed holes}}{\text{number of feedholes per part}}$$

Each time a new measurement is entered into microcontroller 75, it calculates the number of parts according to the above equations and displays the result via display 30. In this way, part counts are quickly displayed and reflect the last entered data, without requiring the user to press a button to start the calculation and display process.

Now referring to FIGS. 4 and 5, a method of use for apparatus 100 is described in more detail. First, the user manually places the protrusion 41 of measuring plate 40 into the center hole 52 of reel 50. The user then measures the first distance 54 at point 48 on ruler 42, and the second distance 55 at point 49 on ruler 42. Both measured values are entered into the apparatus 100 via keypad 20. Correct entry of the values may be confirmed by viewing display 30.

Next, a measurement of the thickness 56 of tape 60 is taken. Measurement of thickness 56 can be accomplished in various ways. In a first way and as discussed above, linear tape 60 maybe exposed from reel 50 and slid into one of the slots in the slotted gauges 43, or by manipulating the measuring plate 40 into a position to compare the slots against consecutive tape wraps on reel 50. The marking 46 that corresponds to the slot 43 that best fits around linear tape 60 is then read to determine the thickness 56. In a second way, measuring plate 40 may be held adjacent to the wound linear tape 60 so that slotted gauges 43 can be compared to the thickness 56 of the linear tape 60 while it is still wrapped on reel 50. The marking 46 that corresponds to the slot on slotted gauge 43 that best matches the thickness 56 of the linear tape 60 is then read to determine the thickness 56. In a third way, ruler 42 or ruler 47 may be used to measure the thickness of the linear tape 60 by visually comparing a wrapped or unwrapped portion of the linear tape 60 to the graduations on the ruler 42, 47. This thickness 56 is then entered similarly to the previous measurements.

Next, the distance 63 between the parts is determined. The user visually inspects the linear tape 60 and counts the number of feed holes 62 in between the center lines of two consecutive parts to determine the distance 63. This feed hole 62 per part count is then entered in a similar manner to the previous measurements.

Upon entry of the last measurement required, an accurate value for the total part count 31 on tape and reel package 200 is calculated by microcontroller 75 and shown on display 30. The user is then free to use apparatus 100 to determine the quantity of another tape and reel package 200 by changing only those measurements that are different on the new tape and reel package 200. Often part quantities are determined for consecutive tape and reel packages 200 with at least one measurement that does not differ from the previous tape and reel package 200. Since only differing measurements need to be changed from one use to the next, the use of the apparatus 100 on multiple tape and reel packages 200 may require much less time to determine the part count on subsequent tape and reel packages 200 than that required for the first.

Particularly unique features of the apparatus 100 are now discussed. Particular embodiments of the invention include all of the necessary measuring and gauging features required to measure tape and reel packages 200, combined with electronic circuitry configured to make the necessary calculations and display calculated part quantities. In a more particular embodiment of the invention, apparatus 100 is completely self-contained, portable, and may be held in one hand. As described herein, certain embodiments of apparatus 100 have a combination of measuring tools and an electronic interface that results in a uniquely compact and low-cost apparatus for the determination of tape and reel part quantities. The result is a far more accurate part count determination as compared to visual estimates, without the cost or operator skill required for bench-top counting machines.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for determining a quantity of parts in a tape and reel packaging system in which a plurality of parts are packaged in a tape wound onto a reel, the apparatus comprising;
   a measuring device;
   a meter body that includes electronic means for calculating a quantity of parts in the tape and reel packaging system, the calculation based on inputs supplied by a user employing the measuring device.

2. The apparatus of claim 1, wherein the measuring device comprises a measuring plate having a slotted gauge and a first ruler.

3. The apparatus of claim 2, wherein the measuring plate has a straight edge that includes markings for the first ruler.

4. The apparatus of claim 3, wherein the measuring plate includes a second ruler located along an edge of the measuring plate opposite the straight edge.

5. The apparatus of claim 3, wherein the measuring plate includes a protruding portion for insertion into a center hole of the reel of the tape and reel packaging system.

6. The apparatus of claim 5, wherein the radius of the center hole is a pre-set constant stored in memory that is part of the electronic means for calculating a quantity of parts in the tape and reel packaging system.

7. The apparatus of claim 2, wherein the slotted gauge includes a plurality of slots, each of a different size, and markings which indicate the sizes of each of the plurality of slots.

8. The apparatus of claim 2, wherein the meter body is integrally attached to the measuring plate.

9. The apparatus of claim 2, wherein the inputs comprise the thickness of the tape used in the tape and reel packaging system, and wherein the thickness of the tape is determined using the slotted gauge.

10. The apparatus of claim 9, wherein the reel of the tape and reel packaging system has a center hole, and wherein the inputs further comprise a first distance from an edge of the center hole to an innermost surface of the wound tape, and a second distance from an edge of the center hole to an outermost surface of the wound tape, wherein the first and second distances are determined using the first ruler.

11. The apparatus of claim 1, wherein the meter body houses a microcontroller, a display, and includes a key pad for data entry, the keypad and display being coupled to the microcontroller.

12. The apparatus of claim 11, wherein the microcontroller is powered by a replaceable battery.

13. The apparatus of claim 11, wherein the microcontroller is configured to automatically display a calculated quantity of parts in the tape of the tape and reel packaging system based on four inputs that have been entered by the user.

14. The apparatus of claim 13, wherein the four inputs comprise a first measured distance, a second measured distance, tape thickness, and number of feed holes per part.

15. The apparatus of claim 11, wherein the meter body houses electronic memory configured to retain the last entry for each of the four inputs after power to the microcontroller has been shut off, such that, when power is restored to the microcontroller, the last four input entries are recalled, and a new quantity is automatically calculated when any one of the four inputs is changed.

16. The apparatus of claim 11, wherein the display is one of an LCD display and an LED display.

17. The apparatus of claim 1, wherein the apparatus is configured to be hand-held during use.

18. The apparatus of claim 1, wherein the parts comprise electronic components.

19. The apparatus of claim 1, wherein the tape includes a plurality of evenly-spaced feed holes, and wherein the distance between adjacent feed holes is a pre-set constant stored in memory that is part of the electronic means for calculating a quantity of parts in the tape and reel packaging system.

20. A method of quantifying parts stored on a tape and reel system, the method comprising:
   determining a radius of a center hole in a standard reel, the reel configured to have tape wound thereon, the tape configured to store a plurality of parts therein;
   including the radius in a measurement apparatus as a pre-set constant;
   measuring a first distance from an edge of the center hole to an inner surface of the tape, and entering the first distance into the measurement apparatus;
   measuring a second distance from an edge of the center hole to an outer surface of the tape, and entering the second distance into the measurement apparatus;
   measuring a thickness of the linear tape using the measurement apparatus, and entering the thickness measurement into the measurement apparatus;
   measuring a distance between the centers of two adjacent parts stored in the linear tape, and entering the distance-between-the-centers-of-two-adjacent-parts measurement into the measurement apparatus; and
   configuring the measurement apparatus to automatically calculate and display the quantity of parts in the tape as the required inputs are entered.

21. The method of claim 20, wherein measuring a thickness of the linear tape comprises measuring a thickness of the linear tape by inserting a portion of the tape into a slotted gauge on a hand-held measurement apparatus, and wherein measuring first and second distances comprises measuring first and second distances using a ruler on the hand-held measurement apparatus.

22. The method of claim 21, further comprising locating the hand-held measurement apparatus on the reel by inserting a protruding portion of the hand-held measurement apparatus into the center hole in the reel such that the ruler is positioned to measure the first and second distances.

23. The method of claim 20, wherein measuring the distance between the centers of two adjacent parts comprises counting a number of feed holes between a first center line on a first part and a second center line on a second part adjacent to the first part.

* * * * *